Figure 1:
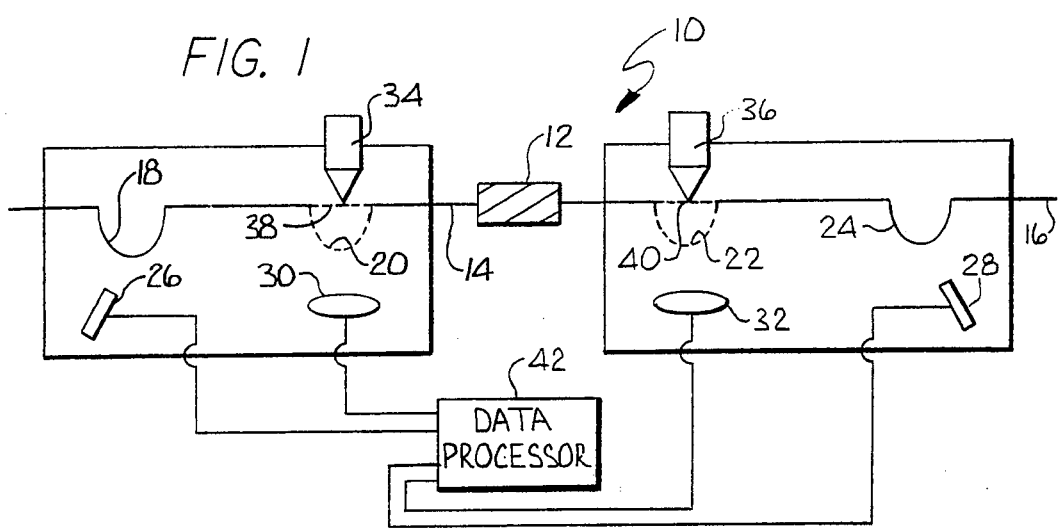

United States Patent [19]

Chappel

[11] Patent Number: 5,357,332
[45] Date of Patent: Oct. 18, 1994

[54] APPARATUS FOR, AND METHOD OF, DETERMINING THE EFFECTIVENESS OF A SPLICE OF OPTICAL FIBER

[75] Inventor: Timothy M. Chappel, Simi Valley, Calif.

[73] Assignee: Photonix Industries, Los Angeles, Calif.

[21] Appl. No.: 928,493

[22] Filed: Aug. 11, 1992

[51] Int. Cl.⁵ .................... G01N 21/84; G01N 21/59
[52] U.S. Cl. ................................................ 356/73.1
[58] Field of Search ..................................... 356/73.1

[56] References Cited

U.S. PATENT DOCUMENTS

| | | | |
|---|---|---|---|
| 4,183,666 | 1/1980 | Tahara et al. | 356/73.1 |
| 4,332,469 | 6/1982 | Wendland | 356/73.1 X |
| 4,360,268 | 11/1982 | Zucker et al. | 356/73.1 |
| 4,629,316 | 12/1986 | Shen et al. | 356/73.1 |
| 4,634,274 | 1/1987 | Shen et al. | 356/73.1 |
| 4,652,123 | 3/1987 | Neumann | 356/73.1 |
| 4,659,215 | 4/1987 | Sumida et al. | 356/73.1 |
| 4,659,217 | 4/1987 | Shen et al. | 356/73.1 |
| 4,664,732 | 5/1987 | Campbell et al. | 156/158 |
| 4,708,476 | 11/1987 | So et al. | 356/73.1 |
| 4,752,125 | 6/1988 | Schickentanz et al. | 356/73.1 |
| 4,770,529 | 9/1988 | Levinson et al. | 356/73.1 X |
| 4,838,690 | 6/1989 | Buckland et al. | 356/73.1 |
| 4,875,772 | 10/1989 | Gentile | 356/73.1 |
| 4,902,327 | 2/1990 | Levinson | 356/73.1 X |
| 4,928,232 | 5/1990 | Gentile | 356/73.1 |
| 4,945,776 | 8/1990 | Yamada et al. | 356/73.1 |
| 4,997,277 | 3/1991 | Horiguichi et al. | 356/73.1 |
| 5,078,489 | 1/1992 | Lieber | 356/73.1 |
| 5,082,368 | 1/1992 | Fuchs et al. | 356/73.1 |
| 5,189,300 | 2/1993 | Lieber et al. | 356/73.1 |

FOREIGN PATENT DOCUMENTS 3828604  3/1990  Fed. Rep. of Germany ..... 356/73.1

*Primary Examiner*—Vincent P. McGraw
*Attorney, Agent, or Firm*—Ellsworth R. Roston; Charles H. Schwartz

[57] ABSTRACT

An apparatus and a method are provided for measuring component attentuation such as the attenuation in a splice of two (2) optical fibers. Four (4) fixed positions are provided. The second position is closer to the splice than the first position on one side of the splice and the third position is closer to the splice than the fourth position on the other side of the splice. Light emitters such as edge light emitting diodes are disposed at the first and fourth positions and light detectors such as ingass detectors are disposed at the second and third positions. The fibers may be looped at the four (4) positions to facilitate the passage of light into and out of the fibers. Clamps may be provided at each of the four (4) positions to provide for selective activation of individual ones of the detectors. In this way, light from each of the light emitters may be selectively passed at individual times to each of the detectors to provide indications at the detectors. A data processor may analyze the indications at the detectors to determine the effectiveness of the splice. In the analysis, the processor may provide the square root of the ratio between the product of two (2) of the indications and the product of the other two (2) indications to determine the attenuation in the splice.

7 Claims, 1 Drawing Sheet

APPARATUS FOR, AND METHOD OF, DETERMINING THE EFFECTIVENESS OF A SPLICE OF OPTICAL FIBER

This invention relates to apparatus for and a method of measuring component attenuation such as in the attenuation in the splice of two (2) optical fibers. This determination is more sensitive, more accurate and faster than in the prior art.

Optical fibers are being increasingly used to transmit voice and data between spaced positions. The use of optical fibers has become relatively common for long distance transmission of voice and data. The use of optical fibers is starting to be provided for short distance transmission between a central station and subscribers' homes and offices. The use of optical fibers for such long distance and short distance transmission is accelerating at a rapid rate.

Optical fibers are intended to replace copper wires or cables because of the distinct advantages of optical fibers over copper wires or cables. One advantage is that energy losses in optical fibers are quite low compared to the energy losses in copper wires. Another advantage is that the frequency spectrum of the signals in optical fibers is considerably greater than the frequency spectrum in copper wires. This allows significantly more data to be transmitted in a single time interval in optical fibers than in copper wires. Furthermore, video information can be transmitted relatively easily in optical fibers but with great difficulty in copper wires. This is becoming progressively important as multimedia systems involving the transmission and reception of combinations of voice, data and images in real time become increasingly common. Another advantage of optical fibers over copper wire is that a greater number of messages can be transmitted simultaneously over an optical fiber than over a copper wire without cross-coupling between such messages.

In order to transmit messages through different paths, different pairs of optical fibers have to be spliced. The fibers have to be precisely aligned in order to maximize the benefits discussed in the previous paragraph and to minimize energy loss as the signals representing voice, data and images pass through the fibers. It is also important that the alignment is made in a minimal time and with minimal effort because of the large and increasing number of splices which have to be made.

Systems have been provided in the prior art to determine the effectiveness of optical splices. The prior art systems have certain disadvantages. They are relatively slow and inefficient and they are somewhat inaccurate because they do not provide precise measurements of the relative efficiency in transmitting messages through a splice between a pair of spliced fibers.

U.S. Pat. No. 4,652,123 issued to Richard L. Neumann on Mar. 24, 1987, for a "Method and Apparatus for Measuring Absolute Fiber Junction Loss" discloses an improved system for determining the effectiveness of an optical splice between a pair of optical fibers. In the system of U.S. Pat. No. 4,652,123, a pair of light emitters couple light into the fibers at the opposite ends of a splice. A detector is initially disposed adjacent one of the fibers and near the splice to detect the amount of light in each of the fibers. The detector is then moved to a position adjacent the other fiber and near the splice to detect the amount of light in each of the fibers. These light detections are then processed to determine the effectiveness of the splice.

Although the system of U.S. Pat. No. 4,652,123 constitutes an improvement over the prior art, is still has certain limitations and disadvantages. For example, since the detector has to be moved from a position adjacent one of the fibers to a position adjacent the other fiber, the operation of the system is relatively slow and inefficient.

In one embodiment of the invention, an apparatus and a method are provided for measuring component attenuation such as measuring the attenuation in a splice of two (2) optical fibers. Four (4) fixed positions are provided. The second position is closer to the splice than the first position on one side of the splice and the third position is closer to the splice than the fourth position on the other side of the splice.

Light emitters such as edge light emitting diodes are disposed at the first and fourth positions and light detectors such as ingass detectors are disposed at the second and third positions. The fibers may be looped at the four (4) positions to facilitate the passage of light into and out of the fibers. Clamps may be provided at each of the four (4) positions to provide for selective activation of individual ones of the detectors.

In this way, light from each of the light emitters may be selectively passed at individual times to each of the detectors to provide indications at the detectors. A data processor may analyze the indications at the detectors to determine the effectiveness of the splice. In the analysis, the processor may provide the square root of the ratio between the product of two (2) of the indications and the product of the other two (2) indications to determine the attenuation in the splice.

The system described above has certain important advantages over the prior art and particularly over the system of U.S. Pat. No. 4,652,123. For example, since the light emitters and detectors are fixedly located during the measurements at the detectors of the light from the light emitters and the detectors are activated by the operation of clamps, the determination of the effectiveness of the splice is more precise than in the systems of the prior art. Furthermore, the determination is faster and more efficient by the system of this invention than by the systems of the prior art because none of the light emitters or detectors has to be moved.

Figure 2:
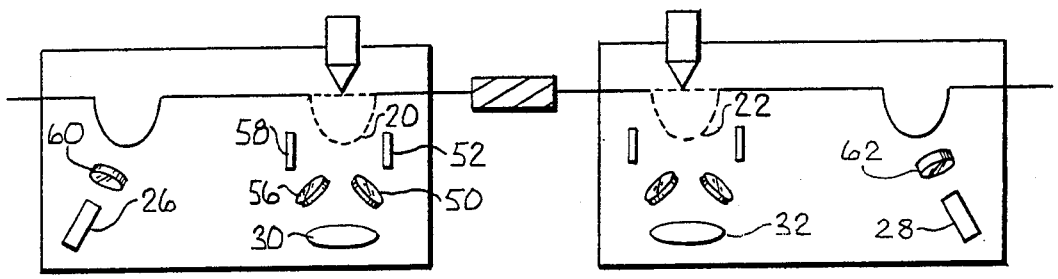

In the drawings:

FIG. 1 is a schematic diagram of the optical and electrical features in a system constituting one embodiment of the invention; and FIG. 2 is a schematic diagram of the electrical and optical features in a system constituting another embodiment of the invention.

A system constituting one embodiment of this invention is generally indicated at 10 in FIG. 1. The system 10 is adapted to measure component attenuation such as the attenuation of a splice 12 linking a pair of optical fibers 14 and 16. Loops are provided at a pair of spaced positions as at 18 and 20 in the optical fiber 14, the loop 20 being closer to the splice 14 than the loop 18. In like manner, loops 22 and 24 are provided at a pair of spaced positions in the optical fiber 16. The loop 22 is closer to the splice 14 than the loop 24. Each of the loops 18, 20, 22 and 24 may respectively have a suitable radius such as approximately two millimeters (2 mm). As will become apparent subsequently, the loops 20 and 24 are provided only at particular instants of time.

Light emitters 26 and 28 are respectively disposed in contiguous relationship to the loops 18 and 24 to couple light from the emitters into the optical fibers 14 and 16. The light emitters 26 and 28 may be edge light emitting diodes which are well known in the art. They may also be lasers. The light may be continuous or it may be pulsed to improve the signal-to-noise ratio. Light detectors 30 and 32 may be respectively disposed at the loops 20 and 22 to receive light passing through the optical fibers 14 and 16. The light detectors may be ingass detectors which are well known in the art. They may also be germanium detectors.

Detector clamp actuators 34 and 36 are respectively associated with the detectors 30 and 32 to selectively control the detection of light at the detectors. The clamp actuators 34 and 36 may be motorized. Suitable clamp actuators 34 and 36 are well known in the art. When the clamp actuators are operated, they respectively cause light in the loops 20 and 22 to be detected by their associated detectors. At such times, the fibers may be bent from a linear configuration, as indicated by lines 38 and 40, to form the loops 20 and 22. The detector clamp actuators 34 and 36 may be selectively actuated by instructions as from a data processor 42, which may be a microprocessor of any suitable construction.

The light emitter 26 may be initially energized by the data processor 42 to couple light into the optical fiber 14. The data processor 42 may initially provide for the detection of light at the detector 30 by operating the detector clamp actuator 34 to produce the loop 20. At this time, the detector clamp actuator 36 is not operated. The detector 30 introduces to the data processor 42 a signal representative of the light detected by the detector 30 at the loop 22. The data processor 42 stores this signal.

The light emitter 26 is then de-energized and the light emitter 28 is energized. The light passing through the splice 12 from the optical fiber 16 is then detected at the loop 20 by the detector 30 and a signal representing this light is introduced to the data processor 42. The data processor 42 stores this signal. The detector clamp actuator 34 is subsequently de-energized and the detector clamp actuator 36 is actuated to form the loop 22.

While the light emitter 28 is still energized, the light at the loop 22 is detected by the detector 32 and the resultant signal is introduced to, and stored in, the data processor 42. The light emitter 28 is then de-energized and the light emitter 26 is energized. The detector 32 then detects the light at the loop 22 from the light emitter 26. The resultant signal is stored in the data processor 42.

The system shown in FIG. 2 is similar to the system shown in FIG. 1. However, in FIG. 2, a lens 50 and a mirror 52 are associated with the detector 30 in FIG. 1. A lens 60 may also be associated with the light emitter 26 to focus the light on the loop 18. The mirror 52 reflects the light travelling through the loop 20 from the emitter 26 and the lens 50 focusses the reflected light on the detector 30. A similar arrangement of a lens 56 and a mirror 58 may be provided in association with the loop 20 to reflect and focus light from the emitter 28 to the detector 30. Similar mirror and lens arrangements may be provided in association with the loop 22 and the detector 32 to reflect and focus light from each of the emitters 26 and 28 to the detector 32. A lens 62 similar to the lens 60 may be associated with the light emitter 28 to focus the light on the loop 24.

The data processor 42 processes the signals from the detectors 30 and 32 to determine the relative amount of the energy loss in the splice. The processing of the signals may be in accordance with the following formula:

$$= \sqrt{P_{26-32} P_{28-32} / P_{26-30} P_{28-30}}$$

In the above equation, $P_{26-32}$ = the amount of light received at the detector 32 from the emitter 26;

$P_{28-32}$ = the amount of light received at the detector 32 from the emitter 28;

$P_{26-30}$ = the amount of light received at the detector 30 from the emitter 26; and $P_{28-30}$ = the amount of light received at the detector 30 from the emitter 28.

The processing of the signals may be in digital form to provide an indication of the splice loss in digital form or analog form. Alternatively, the output from the microprocessor 42 may indicate the efficiency of the splice.

The system and method described above have certain important advantages. They provide precise measurements of splice loss and/or splice efficiency by maintaining the light emitters 26 and 28 and the light detectors 30 and 32 in fixed and precise positions. Since the system and method of this invention provide measurements in a minimal time, there is less of a tendency for signals to drift than in the systems of the prior art. Furthermore, since there is only one (1) detector associated with each individual one of the loops 20 and 22 in the embodiment shown in FIG. 1, the indications of the light passing from the loops are more accurate than the indications in the prior art. The system and method of this invention provide such precise measurements in a minimal time because no adjustments have to be made in the positioning of any light emitters or light detectors after they have been initially and properly positioned. The system and method of this invention provide their output indications in a simple and straight forward manner and with a minimal number of components.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

I claim:

1. Apparatus for determining the effectiveness of a splice of two optical fibers, including, first light emission means for providing on one side of the splice for a first light emission, first light detecting means for providing for a first light detection in spaced relationship to the first light emission at a position closer to the splice than the first light emission, the first light detecting means including a first light detector, second light emitting means for providing on a second side of the splice for a second light emission, second light detecting means for providing for a second light detection in spaced relationship to the second light emission at a position closer to the splice than the second light emission, the second light detecting means including a second light detector, third means for providing at different times for the first light detection by the first light detector from the first light emission and from the second light emission and for the second light detection by the second light detector from the first light emission and the second light emission, fourth means responsive to the detections by the first light detector and the second light detector for processing such detections to provide an indication of the effectiveness of the splice, the first light detecting means including a first lens for directing to the first light detector light passing through a first one of the fibers from the first light emitting means and for directing to the first light detector light passing through the first fiber from the second light emitting means, the second light detecting means including a second lens for directing to the second light detector light passing through the other one of the fibers from the first light emitting means and for directing to the second light detector light passing through the other fiber from the second light emitting means.

2. Apparatus for determining the effectiveness of a splice of two optical fibers, including, first light emission means for providing on one side of the splice for a first light emission, first light detecting means for providing for a first light detection in spaced relationship to the first light emission at a position closer to the splice than the first light emission, the first light detecting means including a first light detector, second light emitting means for providing on a second side of the splice for a second light emission, second light detecting means for providing for a second light detection in spaced relationship to the second light emission at a position closer to the splice than the second light emission, the second light detecting means including a second light detector, third means for providing at different times for the first light detection by the first light detector from the first light emission and from the second light emission and for the second light detection by the second light detector from the first light emission and the second light emission, and fourth means responsive to the detections by the first light detector and the second light detector for processing such detections to provide an indication of the effectiveness of the splice, the third means including means for individually clamping the first and second light detectors to individually provide the light detections by the first and second light detectors from the first and second light emitting means, the first light detecting means including a first lens and a first mirror, the first mirror being disposed to reflect to the first lens light passing to the first mirror through a first one of the fibers from the first light emitting means and the first lens being disposed to pass such light to the first light detector, the first light detecting means also including a second lens and a second mirror, the second mirror being disposed to reflect to the second lens light passing to the second mirror through the first fiber from the second light emitting means and the second lens being disposed to pass such light to the first light detector, the second light detecting means including a third lens and a third mirror, the third mirror being disposed to reflect to the third lens light passing to the third mirror through the other fiber from the first light emitting means and the third lens being disposed to pass such light to the second light detector, and the second light detecting means also including a fourth lens and a fourth mirror, the fourth mirror being disposed to reflect to the fourth lens light passing to the fourth mirror through the other fiber from the second light emitting means and the fourth lens being disposed to pass such light to the second light detector, 3. Apparatus for determining the effectiveness of a splice of two (2) optical fibers, including, p1 a first transducing unit including first light emitting means and first light detecting means displaced by a particular distance from the first light emitting means, the light detecting means including a first light detector, a second transducing unit including second light emitting means and second light detecting means displaced by the particular distance from the second light emitting means, the second light detecting means including a second light detector, the first transducing unit being disposed a first particular distance from the splice on one side of the splice and in coupled relationship to a first one of the optical fibers and the second transducing unit being disposed the particular distance from the splice on the other side of the splice from the first transducing unit and in coupled relationship to the other one of the optical fibers, the first and second light detecting means being respectively disposed closer to the splice than the first and second light emitting means, the first light detector being responsive to the light from the first light emitting means and the second light emitting means and the second light detector being responsive to the light from the first light emitting means and the second light emitting means, means for selectively activating different combinations of the first and second light emitting means and the first and second light detectors to obtain individual output indications from the first and second light detectors, and means responsive to indications from first and second light detectors for analyzing such indications to provide an indication of the effectiveness of the splice, the first and second transducing units being respectively disposed on opposite sides of the optical fibers with the first and second light emitting means and the first and second light detectors being disposed in contiguous relationship to loops in the fibers, the first light detecting means including first optical means for directing to the first light detector light passing through a first one of the optical fibers from first light emitting means and including second optical means for directing to the first light detector light passing through the first optical fiber from second light emitting means, the second light detecting means including third optical means for directing to the second light detector light passing through the other optical fiber from the first light emitting means and including fourth optical means for directing to the second light detector light passing through the other optical fiber from second light emitting means, each of the first through fourth optical means including an individual one of first through fourth mirrors and an individual one of first through fourth lenses, each individual ones of mirrors being disposed to reflect light passing through the associated one of the fibers from the individual one of the light emitting means and each of the first through fourth lenses being disposed to direct to the individual one of first and second light detectors the light reflected by the associated one of the first through fourth mirrors.

4. Apparatus for determining the effectiveness of a splice of two (2) optical fibers, including, means for defining first, second, third and fourth fixed positions, the first and second fixed positions being disposed on one side of the splice in fibers and the third and fourth fixed positions being disposed on the opposite side of the splice, the second and third fixed positions being respectively disposed closer to the splice than the first and fourth fixed positions, means for emitting light from first and fourth fixed positions through the optical fibers toward the splice, means for receiving at the second and third fixed positions the light travelling through the optical fibers from first and fourth fixed positions and for providing indications of such received light, the receiving means at the second fixed position including a single detector for receiving the light from first and fourth fixed positions and the receiving means at the third fixed position including a single detector for receiving light from first and fourth fixed positions, and means for processing the indications from single detectors respectively at the second and third fixed positions to provide an indication of the effectiveness of the light splice, the receiving means at the second position including first optical means for focussing, on the single detector at the second position, the light passing through a first one of the optical fibers from the light emitting means at the first position and second optical means for focussing, on the single detector at the second position, the light passing through the first optical fiber from light emitting means at the fourth position, the receiving means at the third position including third optical means for focussing, on the single detector at the third position, the light passing through the other optical fiber from light emitting means at the first position and fourth optical means for focussing, on the single detector at the third position, the light passing through the other optical fiber from light emitting means at the fourth position.

5. Apparatus as set forth in claim 4, including, the light emitting means at the first and fourth positions being selected from the group consisting of edge light emitting diodes and lasers and each of the single detectors at the second and third positions being selected from the group consisting of germanium and ingass detectors, each of the first through fourth optical means including a focussing lens and a mirror for reflecting light from the associated one of the optical fibers to the associated one of the lenses and for focussing the light on the associated one of the single light detectors.

6. A method of determining the effectiveness of a splice of two (2) optical fibers, including the steps of providing light emitting members at each of first and fourth positions relative to the splice and providing single light detecting members at each of second and third positions relative to the splice, the first and second positions being on one side of the splice and the third and fourth positions being on the opposite side of the splice, the second position being closer to the splice than the first position and the third position being closer to the splice than the fourth position, providing for the selective activation of an individual one of the light emitting members at the first and fourth fixed positions and an individual one of the single light detecting members respectively at the second and third positions to provide for the individual detection by the single light detector at each of the second and third positions of light from each of the first and fourth positions, and processing the individual detections from the single light detecting member at each of the second and third fixed positions from the light emitting member at each of the first and fourth positions to provide an indication of the effectiveness of the splice, individually focussing the light from each of the light emitting members respectively at the first and fourth positions on the single detecting member at the second position, and individually focussing the light from each of the light emitting members respectively at the first and fourth positions on the single light detecting member at the third position.

7. A method of determining the effectiveness of a splice of two (2) optical fibers, including the steps of providing light emitting members at each of first and fourth positions relative to the splice and providing single light detecting members at each of second and third positions relative to the splice, the first and second positions being on one side of the splice and the third and fourth positions being on the opposite side of the splice, the second position being closer to the splice than the first position and the third position being closer to the splice than the fourth position, providing for the selective activation of an individual one of the light emitting members at the first and fourth fixed positions and an individual one of the single light detecting members respectively at the second and third positions to provide for the individual detection by the single light detector at each of the second and third positions of light from each of the first and fourth positions, and processing the individual detections from the single light detecting member at each of the second and third fixed positions from the light emitting member at each of the first and fourth positions to provide an indication of the effectiveness of the splice, the first fiber being provided with a loop at each of the first and second positions to enhance the effectiveness of the light emission at the first position and the light detection at the second position and wherein the second fiber being provided with a loop at each of the third and fourth positions to enhance the effectiveness of the light emission at the fourth position and the detection of the light at the third position, reflecting the light passing through the loop at the second position from the first light emitting member and focussing the reflected light on the single light detecting member at the second position, reflecting the light passing through the loop at the second position from the second light emitting member and focussing the reflected light on the single light detecting member at the second position, reflecting the light passing through the loop at the third position from the first light emitting, member and focussing the reflected light on the single light detecting member at the third position, and reflecting the light passing through the loop at the third position from the second light emitting member and focussing the reflected light on the single light detecting member at the third position.

* * * * *